United States Patent
Noack et al.

(10) Patent No.: US 9,776,524 B2
(45) Date of Patent: Oct. 3, 2017

(54) METHOD AND DEVICE FOR OPERATING A MOTOR VEHICLE WHICH IS DRIVEN WITH THE AID OF AN ELECTRIC MACHINE

(75) Inventors: Christoph Noack, Schwieberdingen (DE); Frank Beruscha, Bietigheim-Bissingen (DE); Michael Dambier, Bretten (DE); Tobias Altmueller, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1304 days.

(21) Appl. No.: 13/206,066

(22) Filed: Aug. 9, 2011

(65) Prior Publication Data
US 2012/0065837 A1    Mar. 15, 2012

(51) Int. Cl.
*G06Q 30/00* (2012.01)
*H02J 7/04* (2006.01)
(Continued)

(52) U.S. Cl.
CPC ....... *B60L 11/1838* (2013.01); *B60L 2250/14* (2013.01); *B60L 2250/18* (2013.01); *B60L 2250/30* (2013.01); *B60L 2260/52* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC ..... B60L 11/1838; B60L 11/1809; H02J 7/04; G06Q 30/00; G06F 17/00

USPC .................. 701/1, 22, 34.4, 533; 705/14.62; 320/155
See application file for complete search history.

(56) References Cited

U.S. PATENT DOCUMENTS

| 2007/0112475 A1* | 5/2007 | Koebler .................... B60L 3/12 701/1 |
| 2009/0144149 A1* | 6/2009 | Sakakibara et al. ............ 705/14 |

(Continued)

FOREIGN PATENT DOCUMENTS

| CN | 101668652 A | 3/2010 |
| CN | 101769746 A | 7/2010 |

(Continued)

*Primary Examiner* — Yuri Kan
(74) *Attorney, Agent, or Firm* — Norton Rose Fulbright US LLP; Gerard Messina

(57) ABSTRACT

A method is described for operating a motor vehicle which is driven with the aid of an electric machine, the electric machine being supplied with electrical energy from an energy store which is charged by an external energy source. To ensure that the driver receives the information concerning readiness for continued travel of the vehicle at the point in time when sufficient energy is present in the energy store in order to reliably reach the intended destination or to cover a predetermined route, the motor vehicle is notified of a destination and/or a route, and the motor vehicle is connected to the external energy source for charging the energy store, the motor vehicle outputting information as to when the energy store has been charged with sufficient energy to reach the destination or to cover the route, and the driver stopping at a next charging station in particular after having reached the destination or having covered the route.

15 Claims, 2 Drawing Sheets

(51) Int. Cl.
*G06F 17/00* (2006.01)
*B60L 11/18* (2006.01)

(56) References Cited

U.S. PATENT DOCUMENTS

| | | | |
|---|---|---|---|
| 2009/0144150 A1* | 6/2009 | Sakakibara | B60L 11/123 |
| | | | 705/14.62 |
| 2010/0106401 A1* | 4/2010 | Naito | B60L 11/1809 |
| | | | 701/533 |
| 2010/0207772 A1 | 8/2010 | Yamamoto | |
| 2010/0256846 A1* | 10/2010 | Shaffer | 701/22 |
| 2010/0268411 A1 | 10/2010 | Taguchi | |
| 2010/0301810 A1* | 12/2010 | Biondo | H04Q 9/00 |
| | | | 320/155 |
| 2012/0065837 A1* | 3/2012 | Noack et al. | 701/34.4 |

FOREIGN PATENT DOCUMENTS

| | | |
|---|---|---|
| JP | 2003329474 A | 11/2003 |
| JP | 2005168085 A | 6/2005 |
| JP | 2008-054439 A | 3/2008 |
| JP | 2008054439 A | 3/2008 |
| JP | 2008278559 A | 11/2008 |
| JP | 2009148121 | 7/2009 |
| JP | 2009247057 A | 10/2009 |
| JP | 2010193560 A | 9/2010 |
| JP | 2010252449 A | 11/2010 |
| JP | 2011-120346 A | 6/2011 |
| JP | 2011151896 A | 8/2011 |
| WO | 2011092729 A1 | 8/2011 |

* cited by examiner

METHOD AND DEVICE FOR OPERATING A MOTOR VEHICLE WHICH IS DRIVEN WITH THE AID OF AN ELECTRIC MACHINE

FIELD OF THE INVENTION

The present invention relates to a method for operating a motor vehicle which is driven with the aid of an electric machine, the electric machine being supplied with electrical energy from an energy store which is charged by an external energy source, and a device for carrying out the method.

BACKGROUND INFORMATION

Motor vehicles having an electric drive, for example hybrid vehicles or vehicles having only one drive which is designed as an electric drive, have energy stores which are able to store energy only for a certain range of the motor vehicle due to the low energy density of the energy stores used. The energy store must therefore be frequently charged. For this purpose, an infrastructure exists which has numerous charging stations at which the energy store may be recharged. Since the charging process takes a certain amount of time, the driver must have the chance to use this time in some other way. However, the driver would like to continue travel as quickly as possible.

SUMMARY OF THE INVENTION

The method according to the present invention for operating a motor vehicle which is driven with the aid of an electric machine, having the features described herein, has the advantage that the driver first receives the information concerning continuation of travel not when the energy store is completely recharged, but, rather, at the point in time when sufficient energy is present in the energy store to reliably reach a previously announced destination or to cover a predetermined route. The waiting time for the driver is significantly reduced as a result of the motor vehicle being notified of a destination and/or a route, and the motor vehicle being connected to the external energy source for charging the energy store, the motor vehicle outputting information as to when the energy store has been charged with sufficient energy to reliably reach the destination or to cover the route, and the driver stopping at a next charging station in particular after having reached the destination or having covered the route. Completely charging the energy store may be dispensed with, since the energy store may be recharged after reaching the next destination.

The information is advantageously output directly to the driver. The driver, who is able to meaningfully use the time in some other way during charging of the energy store, receives the information as to when the vehicle has been charged with enough energy to reach the next destination or to cover the predetermined route. Due to the received information, the driver may continue his trip without delay.

In one embodiment, the information is output wirelessly from the motor vehicle to the driver, in particular to a mobile telephone and/or a vehicle key. It is useful to inform the driver via a use element which the driver routinely carries with him. Design effort for an additional information device is thus dispensed with. In particular when wireless connections are used, the vehicle information, which is automatically output by the motor vehicle, may also be transmitted over fairly great distances, thus increasing the freedom of movement of the driver.

In another aspect, the information is temporarily stored and is retrieved by the driver. The driver is thus informed at all times concerning the instantaneous charging state of the energy store, and is able to coordinate his further activities based on this information.

In one variant, the information is stored in an intelligent energy management system of the motor vehicle. The intelligent energy management system includes the energy store management system of the motor vehicle, and has numerous interfaces for further devices, in particular for a driver information system in the motor vehicle. Devices present in the vehicle per se may thus be used for informing the driver.

Alternatively, the information is stored on a server, external to the motor vehicle, which is accessed via the Internet. Thus, the driver may be informed of the charging state of the vehicle from any given location outside the vehicle, for example in the office, without the need for additional hardware equipment.

In another specific embodiment, the destination and/or the route is/are input by the driver. This input may take place in the motor vehicle by using the driver information system, or outside the vehicle by using a prevalent data infrastructure such as the Internet, SMS via a mobile telephone, or the like.

In addition, the route is learned by the motor vehicle. This applies in particular for habitually traveled routes, such as the daily commute to the workplace. The energy management system stores the vehicle information concerning the driving style of the driver, the surrounding conditions of the travel route, for example uphill or downhill roadways, roadway conditions, traffic conditions, and the roadways used, such as expressways or rural roadways. This information is taken into account in determining the energy required for reaching the destination. Accordingly, based on this information at least enough energy is charged into the energy store which is necessary for reliably reaching the destination. The term "reliably" is understood to mean that the vehicle reaches its destination, even with traffic congestion and the detours which necessarily result.

The driver advantageously interacts with the motor vehicle in order to change the predetermined destination and/or the predetermined route. Once the route or destination has been input into the vehicle, it may be changed by the driver at any time via a bidirectional data connection.

In one refinement, the driver retrieves the instantaneous charging state of the energy store and/or an estimated remaining charging period. Based on this information, the driver may appropriately budget the remaining time until the trip is continued.

In one embodiment, the route is changed via a wireless connection, in particular via remote control. This is particularly advantageous when the driver is outside the vehicle and changes his plans for continued travel. Thus, the driver does not have to enter the vehicle to change the already input data, and instead may use existing wireless connections to the motor vehicle such as radio connections, mobile telephone, or Internet, and the driver is not bound to fixed locations in order to establish connection with the motor vehicle.

In particular, the information is output as a function of the instantaneous traffic situation and/or the charging infrastructure. If the route or the destination is changed, the instantaneous traffic conditions are always taken into account in computing the energy necessary to be charged in order to ensure that the intended destination is reached using the energy present in the energy store.

In another variant, the driver notifies the intelligent energy management system of the earliest departure time, the motor vehicle delivering excess energy from the energy store to a power network. With the aid of a so-called smart grid (intelligent power network), the capacity of the energy store during a charging operation may thus be used for buffering the intelligent power network, in that the energy store delivers to the power network the energy not required for the continued travel. The planned departure time may be changed by the driver at any time; this may be carried out by local access in the motor vehicle or by remote access via a wireless connection. At any predetermined point in time, the energy management system of the motor vehicle ensures that the energy store has a sufficient or complete charging state which corresponds to the configuration.

One refinement of the exemplary embodiments and/or exemplary methods of the present invention relates to a device for operating a motor vehicle which is driven with the aid of an electric machine, the electric machine being supplied with electrical energy from an energy store which is charged by an external energy source. To ensure that the driver receives the information concerning readiness for continued travel of the vehicle at the point in time when sufficient energy is present in the energy store in order to reliably reach the intended destination or to cover a predetermined route, an arrangement is provided in the motor vehicle via which the motor vehicle is notified of a destination and/or a route, and when the motor vehicle is connected to the external energy source for charging the energy store, the arrangement outputs information as to when the energy store has been charged with sufficient energy to reach the destination or to cover the route. Complete charging of the energy store may be dispensed with, since the energy store may be recharged after reaching the next destination.

An intelligent energy management system advantageously outputs the information. Additional devices in the motor vehicle may thus be dispensed with. The intelligent energy management system includes the energy store management system of the motor vehicle, and has numerous interfaces with other devices, in particular with a driver information system in the motor vehicle. Devices present in the vehicle per se are thus used for informing the driver by merely providing them with an additional function.

The exemplary embodiments and/or exemplary methods of the present invention allow numerous specific embodiments, one of which is explained in greater detail with reference to the figures illustrated in the drawings.

DETAILED DESCRIPTION

Figure 1:
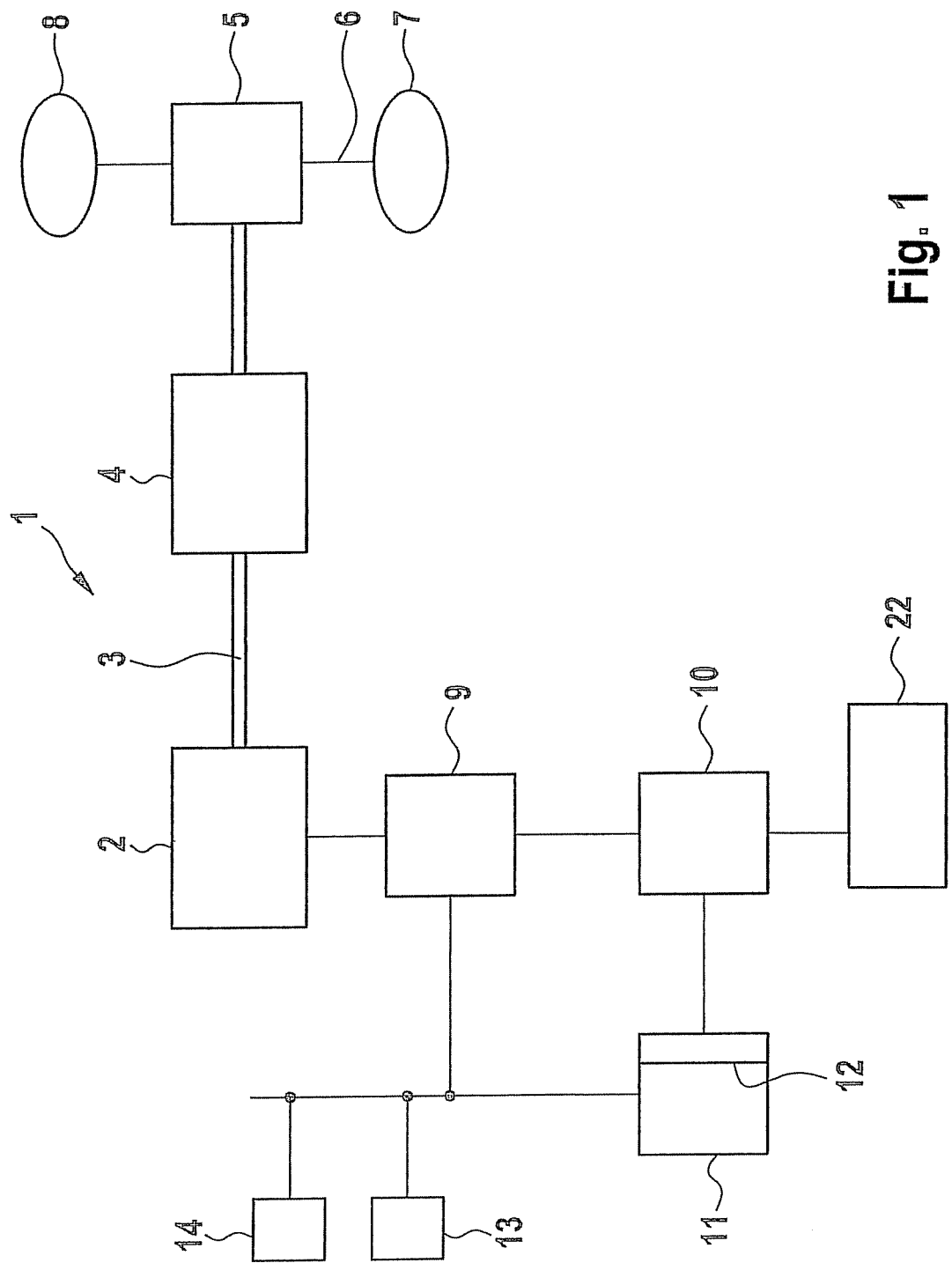
FIG. 1 shows a schematic diagram of a drive of a motor vehicle having an electric machine.

Identical features are denoted by the same reference numerals.

FIG. 1 shows a schematic diagram of an electric drive 1 in a motor vehicle, for example a hybrid vehicle. An electric machine 2 rotates a shaft 3 of drive 1, the shaft being connected to a transmission 4. Transmission 4 leads to a differential 5 which is situated on a drive axle 6 of the motor vehicle and which uniformly distributes the mechanical energy provided by electric machine 2 to the two wheels 7, 8 mounted on drive axle 6 of the motor vehicle, thus setting the motor vehicle in travel motion. Electric machine 2 is connected to a battery 10 via a pulse-controlled inverter 9, and receives from the battery the energy necessary for the drive; in engine mode of the electric machine, pulse-controlled inverter 9 converts the direct current voltage of battery 10 into alternating voltage, and in generator mode of electric machine 2 the alternating voltage provided by electric machine 2 is converted into direct current voltage for charging battery 10. Pulse-controlled inverter 9 includes a control unit, not illustrated in greater detail, for electric machine 2, with the aid of which the operating mode of electric machine 2 is adjusted and controlled.

In addition, battery 10 and pulse-controlled inverter 9 are connected to an intelligent energy management system 11, which includes a battery management system 12. Intelligent energy management system 11 is connected to various electrical devices which are used as auxiliary consumers, for example comfort systems 13 (air conditioning system, for example) and assistive devices 14 (adaptive cruise control, for example) of the motor vehicle.

Figure 2:
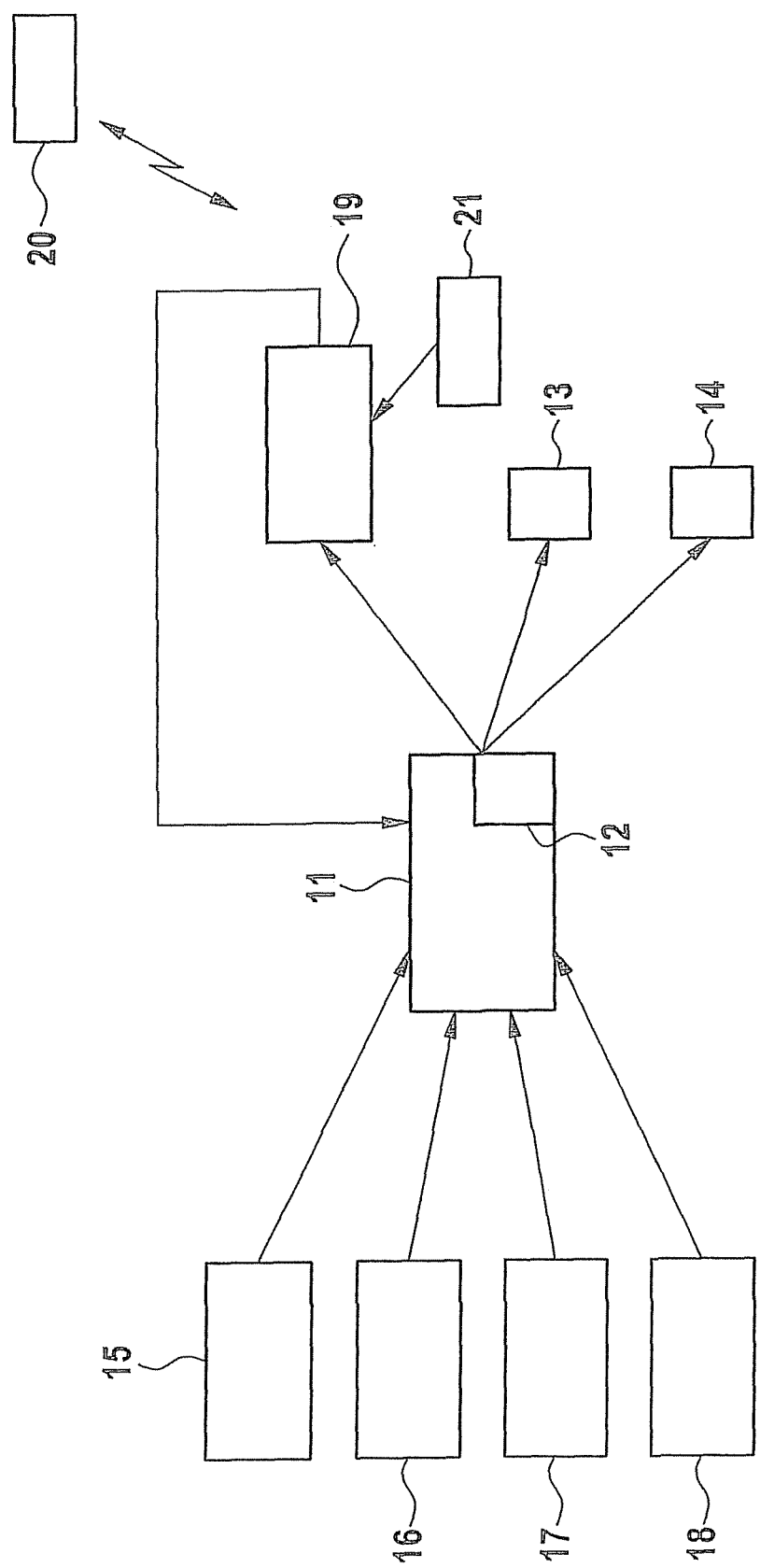
FIG. 2 shows communication connections of an intelligent energy management system in a motor vehicle having an electric drive.

In order to distribute the energy, which is provided by battery 10 for the drive of electric machine 2 as well as for auxiliary electrical consumers 13, 14, to electric machine 2 and auxiliary consumers 13, 14 in such a way that electric machine 2 receives sufficient energy to reach the destination predetermined by the driver before the next charging cycle, intelligent energy management system 11 communicates with other systems of the motor vehicle, as illustrated in FIG. 2.

On the one hand, intelligent energy management system 11 is connected to a navigation system 15, a digital map 16, a vehicle status system 17, and a radio receiver 18 which has a traffic message channel (TMC). Navigation system 15, digital map 16, vehicle status system 17, and traffic message channel 18 supply intelligent energy management system 11 with input information concerning, for example, the route, distance, roadway conditions, and surroundings conditions such as temperature, precipitation, and the roadway traffic situation. Intelligent energy management system 11 is also informed about the loading condition of the vehicle and the driving style of the driver.

Battery management system 12 contained in intelligent energy management system 11 transmits information to intelligent energy management system 11 concerning the instantaneous state of battery 10 of the vehicle, and the future anticipated electrical response. This information includes battery-relevant variables such as the charging state, the aging state, and the capacity of battery 10.

Intelligent energy management system 11 processes the data provided to it by navigation system 15, digital map 16, vehicle status information system 17, traffic message channel 18, and battery management system 12. Based on this information and the planned route of the motor vehicle, intelligent energy management system 11 estimates the energy required by electric machine 2 of the vehicle for reaching the destination predetermined by the driver, without having to stop at a charging station 22.

In addition, intelligent energy management system 11 is connected to a driver information system 19 via which the intelligent energy management system interacts with the driver. The driver provides inputs to intelligent energy management system 11, via driver information system 19, which intelligent energy management system 11 must take into account.

Driver information system 19 interacts with the driver in various ways. Thus, the driver may notify vehicle information system 19 of his inputs directly on site in the motor vehicle via a keyboard 21. However, the driver may also communicate with vehicle information system 19 via a wireless connection using a remote control 20.

Such communication is advantageous in particular when the driver has connected the vehicle to an energy charging station and is located outside the vehicle.

Upon leaving the vehicle, the driver has specified to the driver information system, either via keyboard 21 or via remote control 20, the next route and/or the next destination to be reached. Alternatively, however, for habitually traveled routes it is possible that the vehicle has automatically learned the travel route. Since the driver would like to be informed as to when the energy store has charged sufficient energy to reach the next destination or to cover the input route, intelligent energy management system 11 computes the energy necessary for this purpose. Energy management system 11 also takes into account the instantaneous traffic situation, such as traffic congestion or roadway construction, and rush-hour traffic, the travel route, such as via expressways, rural roadways, or city streets, and surroundings conditions such as rain and snow, as well as the loading condition of the motor vehicle. As described above, energy management system 11 receives all of this information from the information services to which it is connected, such as navigation system 15, digital map 16, vehicle status information system 17, traffic message channel 18, and battery management system 12. In addition, intelligent energy management system 11 monitors the instantaneous charging state of battery 10.

When the charging state of battery 10 is reached, which has been computed by intelligent energy management system 11 for reaching the destination using a predetermined route, intelligent energy management system 11 outputs, without prompting, information to the driver via driver information system 19. Since the driver is not in the vehicle, this is carried out wirelessly via remote control 20. The term "remote control" is understood to mean all possible devices with the aid of which the driver is able to communicate wirelessly with the motor vehicle. Thus, remote control may include a vehicle key or the driver's mobile telephone, or also an external server which the driver may access via the Internet. Thus, when the charging state of battery 10 is sufficient, driver information system 19 is able to send an SMS to the driver on his mobile telephone, or transmit a signal to the vehicle key.

If, after leaving the vehicle, the driver wants to be independently informed of the instantaneous charging state and/or the estimated remaining charging period (the remaining time until enough energy is charged in battery 10 to be able to reach the predetermined destination), this information may be retrieved, for example by the driver sending a trigger SMS to driver information system 19 via his mobile telephone, stating a voice instruction in the motor vehicle, or making a request via the Internet. When the request is made via the Internet, it must be ensured that driver information system 19 stores the information, provided by energy management system 11, concerning the charging state of battery 10 and the remaining charging period at regular intervals on a server which the driver accesses when there is a need for information. Driver information system 19 forwards the driver's request to energy management system 11, and returns the response to the driver in the same way that the request was input.

There is also the option for the driver to change a destination or route which has been predetermined once. This may be carried out by the driver modifying the inputs via keyboard 21 in the vehicle or via the various wireless communication options described above. After the energy management system has made new computations based on the changed destination or route information, the driver is automatically provided with information concerning the instantaneous charging state of battery 10 and the remaining charging period.

If the instantaneous charging state of battery 10 allows continued driving of the motor vehicle to the intended destination, but the driver does not yet want to make the trip because the vehicle is still connected to the energy charging station, the energy which exceeds the amount required to reach the destination is fed to an intelligent power network (smart grid), where it is used for buffering the power network. However, at all times it must be ensured that at the point in time at which the driver would like to make the trip to the predetermined destination, sufficient energy is contained in energy store 10 to reach the intended destination.

What is claimed is:

1. A method for operating a motor vehicle which is driven with the aid of an electric machine, which is supplied with electrical energy from an energy store which is charged by an external energy source, the method comprising:
    notifying the motor vehicle of at least one of a destination and a route, wherein the motor vehicle is connected to the external energy source for charging the energy store; and
    outputting, via the motor vehicle, information as to when the energy store has been charged with sufficient energy to at least one of reach the destination and cover the route, wherein the driver stops at a next charging station after having at least one of reached the destination and covered the route.

2. The method of claim 1, wherein the information is output directly to the driver.

3. The method of claim 2, wherein the information is output wirelessly from the motor vehicle to the driver via at least one of a mobile telephone and a vehicle key.

4. The method of claim 1, wherein the information is temporarily stored and is retrieved by the driver.

5. The method of claim 4, wherein the information is stored in an intelligent energy management system of the motor vehicle.

6. The method of claim 4, wherein the information is stored on a server, external to the motor vehicle, which is accessed via the Internet.

7. The method of claim 1, wherein the at least one of the destination and the route is input by the driver.

8. The method of claim 1, wherein the route is learned by the motor vehicle.

9. The method of claim 7, wherein the driver interacts with the motor vehicle to change at least one of the predetermined destination and the predetermined route.

10. The method of claim 9, wherein the driver retrieves at least one of an instantaneous charging state of the energy store an estimated remaining charging period.

11. The method of claim 9, wherein the route is changed via a wireless connection, via a remote control.

12. The method of claim 1, wherein the information is output as a function of at least one of an instantaneous traffic situation and a charging infrastructure.

13. The method of claim 1, wherein the driver notifies the intelligent energy management system of the earliest departure time, and wherein the motor vehicle delivers excess energy from the energy store to a power network.

14. A device for operating a motor vehicle which is driven with the aid of an electric machine, which is supplied with electrical energy from an energy store which is charged by an external energy source, comprising:

a notifying arrangement, in the motor vehicle, to notify the motor vehicle of at least one of a destination and a route, wherein when the motor vehicle is connected to the external energy source for charging the energy store, the notifying arrangement outputs information as to when the energy store has been charged with sufficient energy to at least one of reach the destination and cover the route.

15. The device of claim 14, wherein an intelligent energy management system outputs the information.

\* \* \* \* \*